United States Patent [19]
Greenberg

[11] 3,989,220
[45] Nov. 2, 1976

[54] SHAKER MOLDING ASSEMBLY

[76] Inventor: Allen A. Greenberg, 3531 N. 47th Ave., Hollywood, Fla. 33021

[22] Filed: Dec. 1, 1975

[21] Appl. No.: 636,662

Related U.S. Application Data

[62] Division of Ser. No. 164,740, July 21, 1971, Pat. No. 3,958,997.

[52] U.S. Cl. .............................. 249/105; 249/53 R; 249/55; 249/139; 249/164; 425/DIG. 57; 249/160
[51] Int. Cl.² ........................ B22C 9/22; B29C 1/16
[58] Field of Search .............. 425/DIG. 57; 249/104, 249/55, DIG. 4, 121, 120, 127, 128, 103, 139, 140, 105, 155, 156, 163, 164

[56] References Cited
UNITED STATES PATENTS 3,861,640   1/1975   Agneta ........................... 249/160 X

*Primary Examiner*—Francis S. Husar
*Assistant Examiner*—John S. Brown
*Attorney, Agent, or Firm*—James W. Pearce; Roy F. Schaeperklaus

[57] ABSTRACT

A shaker molding assembly. The assembly includes mold halves which are urged together as they are pushed into a holder. A measuring cup can be held against the mold halves to urge them into the holder. Ribs on the mold halves cooperate with a frusto-conic wall of the holder to urge the mold halves together. A mixture of water and a molding powder are shaken together in the assembly to form a smooth mixture. The molding powder includes an alkali metal alginate, calcium sulfate, tetrasodium pyrophosphate, and a filler. The mixture sets to form a jelly-like object which dries to form a rigid object of smaller size which is a substantially exact miniature of the jelly-like object.

5 Claims, 10 Drawing Figures

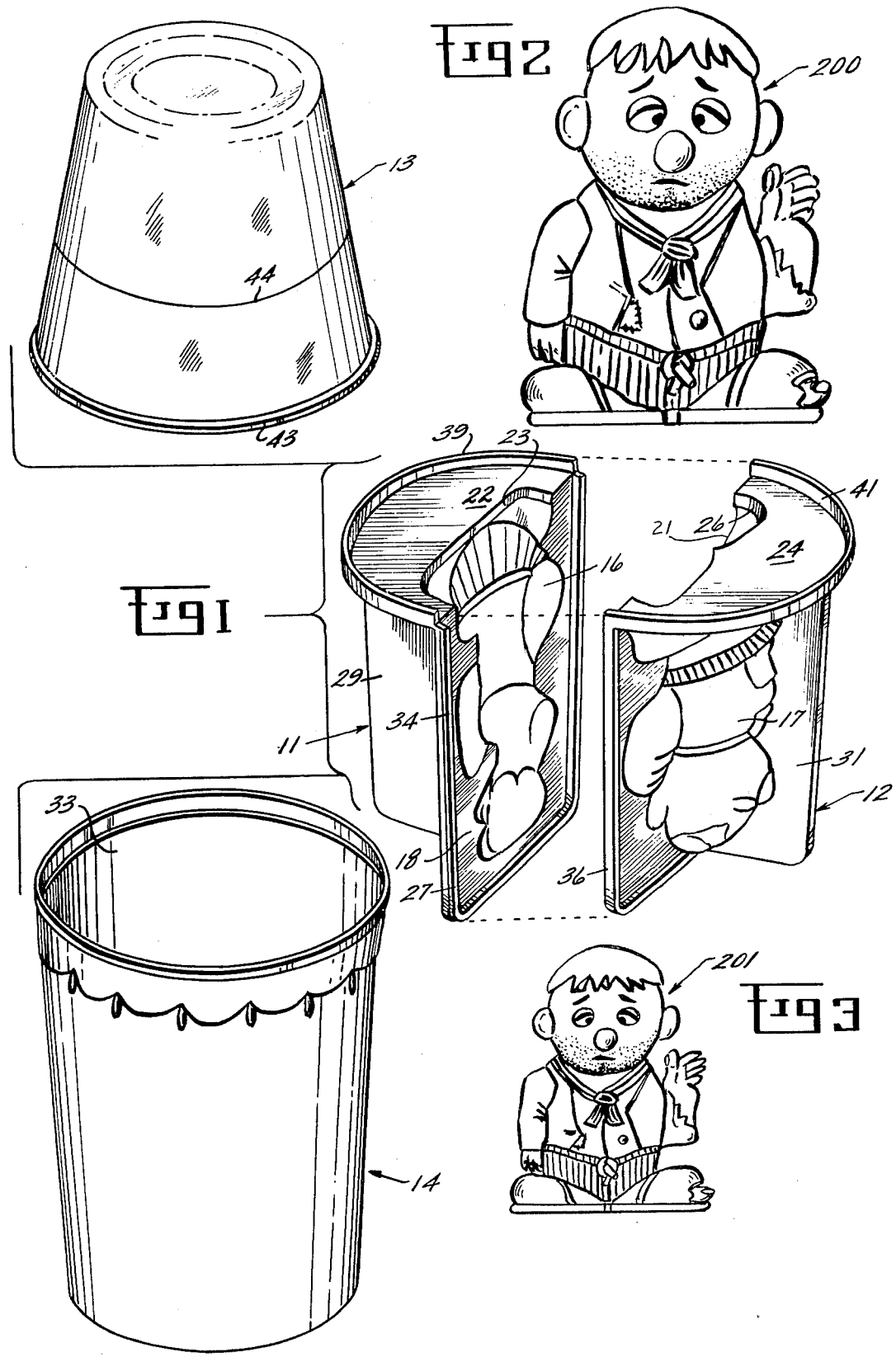

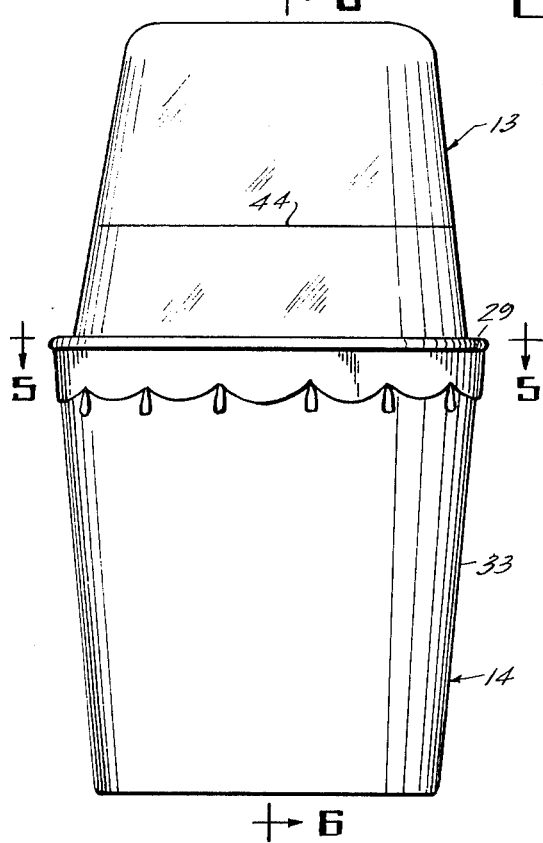
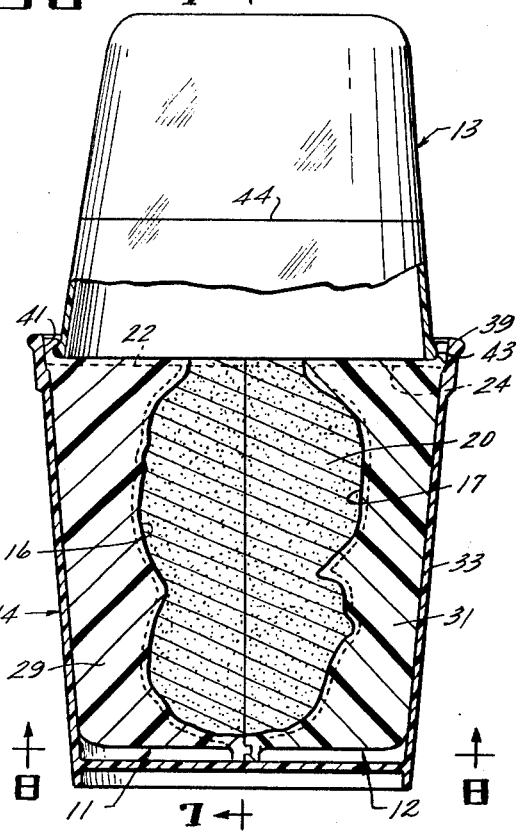
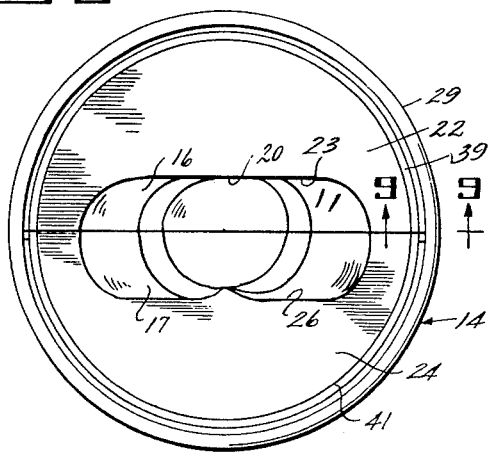
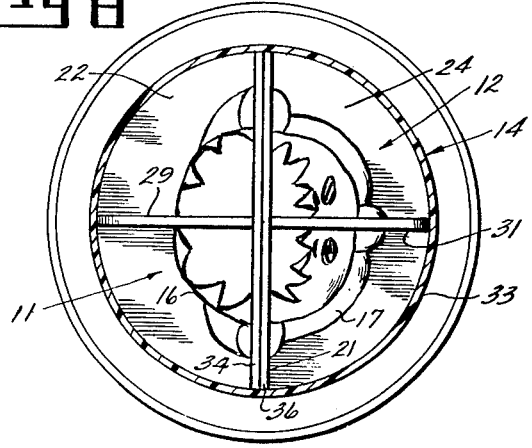

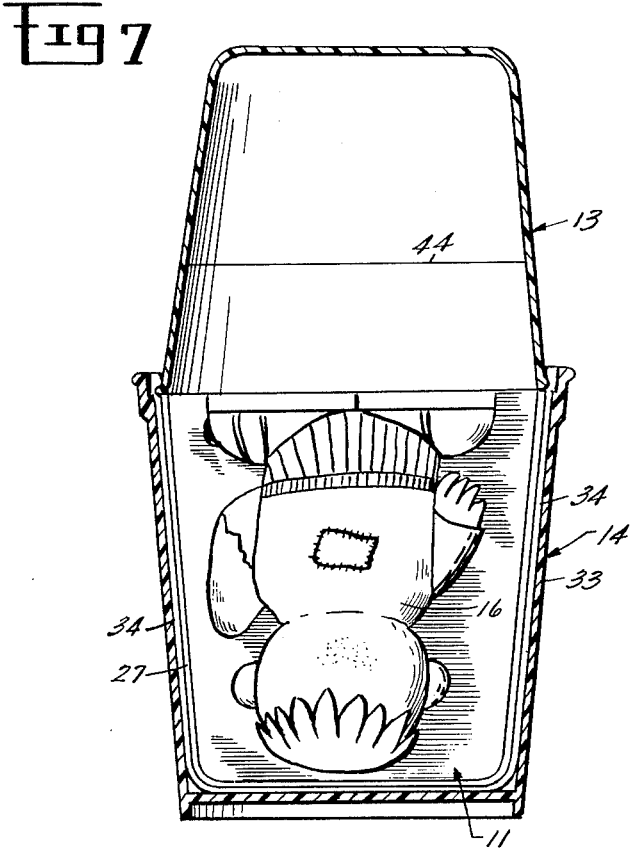
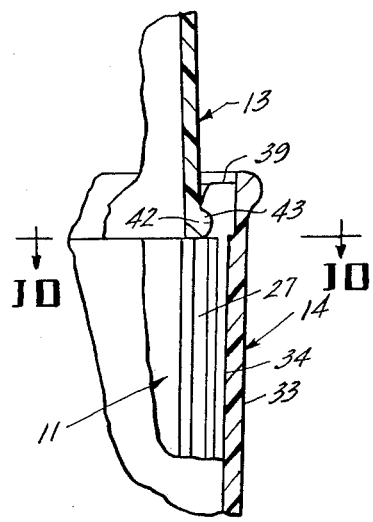
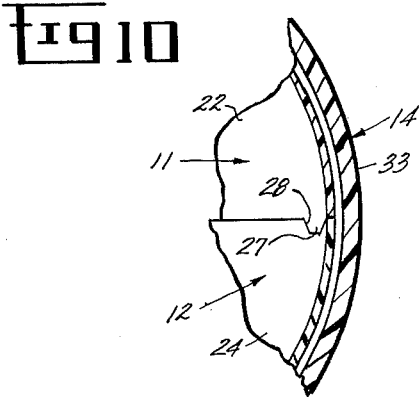

3,989,220

SHAKER MOLDING ASSEMBLY

This is a division of my copending application Ser. No. 164,740 filed July 21, 1971 now U.S. Pat. No. 3,958,997 issued May 25, 1976.

This invention relates to molding apparatus.

An object of this invention is to provide a molding apparatus which includes a shaker-mixer device in which ingredients to be molded are shaken to be mixed before setting in the mold.

A further object of this invention would be to provide an apparatus for forming a molded object in which water and a molding powder mixture are shaken together in a shaker-mixer-mold device to cause intimate mixing of the water and the molding powder mixture and in which the mixed water and molding powder mixture passes directly to a mold cavity in which the object is molded.

A further object of this invention is to provide such an apparatus in which a molded object of a jelly-like consistency is formed in the mold cavity which object shrinks while maintaining its molded shape to a stiff object of substantially smaller size than the molded object but of almost exactly the same shape.

Briefly, this invention provides a shaker-mixer-mold assembly which includes a measuring cup member, mold sections which can be held in engagement with the edge of the measuring cup member with a mold cavity of the mold sections in communication with the interior of the measuring cup member, and a mold holding cup-shaped holder member inside which the mold sections are received to be held in assembled relation thereof are shaken. Water and a molding powder mixture can be placed in the measuring cup member, the mold sections and the holder member are assembled therewith, and the water and powder are shaken together inside this assembly to provide a uniform mixture. Then the assembly is set with the measuring cup member up, and the contents flow into the mold cavity to set thereinside. The molding powder mixture can consist essentially of potassium alginate and diatomaceous earth, there being sufficient potassium alginate to bind the diatomaceous earth and water into a jelly-like molded mass. When the object is removed from the mold, it dries and shrinks, but, as the object shrinks it retains its shape to form a rigid dried object which is a miniature of the original molded mass having the shape of the mold cavity. The miniature retains almost perfectly the proportions of the original.

The above and other objects and features of the invention will be apparent to those skilled in the art to which this invention pertains from the following detailed description and the drawings, in which:

FIG. 1 is an exploded perspective view showing a molding device constructed in accordance with an embodiment of this invention;

FIG. 2 is a view in front elevation of an object molded in the molding device of FIG. 1 as the object emerges from mold members thereof;

FIG. 3 is a view in front elevation of the object molded in the molding device of FIG. 1 after it has dried and shrunk to final form;

FIG. 4 is a view in front elevation of the molding device shown in FIG. 1 with sections thereof in assembled relation;

FIG. 5 is a plan view looking in the direction of the arrows 5—5 in FIG. 4;

FIG. 6 is a view in section taken on the line 6—6 in FIG. 4;

FIG. 7 is a view in section taken on the line 7—7 in FIG. 6;

FIG. 8 is a view in section taken on the line 8—8 in FIG. 6;

FIG. 9 is an enlarged view in section taken on the line 9—9 in FIG. 5; and

FIG. 10 is a view in section taken on the line 10—10 in FIG. 9.

In the following detailed description and the drawings, like reference characters indicate like parts.

In FIG. 1 is shown a shaker-molding device constructed in accordance with an embodiment of this invention which includes relatively thin mold halves 11 and 12, a measuring cup 13 and a mold holder 14. The mold halves 11 and 12 include opposed concave portions 16 and 17, respectively, which cooperate to form a mold cavity 20 (FIG. 6) for forming an object 200, which can be of the form shown in FIG. 2. A flat face portion 18 of the mold half 11 (FIG. 1) outboard of the mold cavity 16 engages a flat face portion 21 of the mold half 12 outboard of the mold cavity 17. The flat faces 18 and 21 surround three sides of each of the mold cavities 16 and 17, respectively, with a fourth side of each mold cavity being open. A face 22 of the mold half 11 defines an open side 23 of the mold cavity 16. A face 24 of the mold half 12 defines a corresponding open side 26 of the mold cavity 17. A tongue 27 which extends in a U-shape around an outer edge of the flat face 18 of the mold half 11 is received in a complementary groove 28 (FIG. 10) in the mold half 12 to locate mold halves during assembly. Wedge shaped ribs 29 and 31 are formed on the mold halves 11 and 12, respectively. The rib 29 extends in a plane perpendicular to the plane of the flat face 18 and of the face 22 of the mold half 11. The rib 31 extends in a plane perpendicular to the planes of the flat face 21 and of the face 29 of the mold half 12. The mold halves can be made of firm but relatively flexible material such as polyethylene or the like.

The mold holder 14 includes a wall 33 which defines a cavity of frusto-conic shape. The wall 33 is complementary to and cooperates with the wedge shaped ribs 29 and 31 and side edges of faces 18 and 21 of the mold halves 11 and 12, respectively, when the mold halves are disposed inside the mold holder, as shown in FIGS. 6 and 7, so that when the mold halves are pushed into the mold holder, interaction between the ribs 29 and 31 and the wall 33 of the mold holder 14 urges the mold halves together with the flat face 18 of the mold half 11 firmly engaging the flat face 21 of the mold half 12. Upright outer edges 34 of the flat face 18 of the mold half 11 and upright outer edges 36 of the mold half 12 also are complementary to the wall 33 of the mold holder 14 and serve to position the mold halves properly inside the mold holder. The mold holder can be formed of appropriate relatively rigid plastic material such as polystyrene.

Outer edges of the faces 22 and 24 of its mold halves 11 and 12 are circular and are provided with upstanding ribs 39 and 41, respectively. Details of construction of the rib 39 are shown in FIG. 9, the rib 41 being of similar construction. The rib 39 is provided with an inwardly opening slot 42 which receives a flange 43 at the mouth of the measuring cup 13 to lock and seal the edge of the measuring cup to the mold halves. The ribs 39 and 41 cooperate to form an annular upstanding rib when the mold halves are assembled.

The measuring cup 13 can be formed of transparent material such as transparent plastic material or glass and is provided with an indicator line 44 indicating a line to which the measuring cup is to be filled with water in performing a molding operation. The volume of the liquid contained in the measuring cup 13 when filled to the indicator line 44 can be the volume which, when mixed with a predetermined amount of molding powder, will fill the mold cavity 20.

When a molding operation is to be instituted, the measuring cup 13 is set in upright position (inverted from the FIG. 1 position) and water is added to the measuring cup until the water is at the level of the line 44. To the water is added a predetermined amount or batch of a molding powder which preferably consists of the following:

10 percent potassium alginate
12 percent $CaSO_4.2H_2O$
¾ percent anhydrous tetrasodium pyrophosphate
74¼ percent coarse ground diatomaceous earth
1 percent pigment, all percentages being by weight, all constituents being ground to form a powder. The weight of the batch of molding powder can be approximately one-sixth of the weight of the water.

When the batch of molding powder has been added to the water in the measuring cup 13, the mold halves 11 and 12 are assembled on the flange 43 of the measuring cup, and the mold holder 14 is mounted thereover. The tongue and groove portions 27, 28 serve to locate the mold halves. The mold holder 14 and the measuring cup 13 can then be grasped and pushed toward each other to force the mold halves together. The mold halves 11 and 12 and the measuring cup 13 lock together, and the liquid and the molding powder are contained within the mold halves and the measuring cup. Urging of the measuring cup toward the mold halves causes a tight seal between the edge of the measuring cup and mold halves. The contents of the assembly can be shaken for approximately twenty seconds to cause thorough mixing of the molding powder and the water. Then the assembly is set in the position shown in FIG. 6 and the contents flow into the mold cavity 20 and set or gel therein. After approximately five minutes, the assembly is taken apart. The measuring cup 13 is removed, the mold holder is inverted, and the edge of the mold holder is tapped on a table or the like (not shown) to cause the mold halves to be released from the mold holder. The mold halves are then withdrawn in directions normal to the flat face portions 18 and 21 to release the molded object 200 (FIG. 2). As removed from the mold halves, the object 200 is of a jelly-like consistency. As the object dries, it shrinks but retains its shape and appearance and eventually, after a period of a few days of drying at room temperature, becomes a dried object having a volume of approximately one-fourth the original volume, as indicated in FIG. 3 at 201. The dry object is rigid and dry to the touch unlike the original jelly-like object as removed from the mold halves.

The molding powder formulation given above is the preferred formulation. However, another alkali metal alginate such as sodium alginate can be used instead of potassium alginate. The percentage of alkali metal alginate can vary from about 7 to about 15 percent of the molding compound with the percentage of $CaSO_4.2H_2O$ being 1.2 times the percentage of alkali metal alginate. Diatomaceous earth is the preferred filler for the molding powder composition but other inert fillers can be used in place of the diatomaceous earth such as silica, magnesium carbonate, and kaolin (china clay).

The percentage of the tetrasodium pyrophosphate can also be varied from ¾ percent to approximately 3 percent, but with more than 3 percent tetrasodium pyrophosphate, the setting or gelling time may be ½ hour or more, and larger percentages of tetrasodium pyrophosphate would result in excessive setting or gelling times longer than ½ hour.

The molding assembly and the method of forming a molded article described above and illustrated in the drawings is subject to modification without departing from the spirit and scope of the appended claims.

I claim:

1. A shaker molding assembly which comprises a pair of mold halves, each of said mold halves including a mold cavity, a flat face extending outwardly from sides and one end of the mold cavity, and an end face plate having an end face extending outwardly from the other end of the mold cavity, the mold cavity being open at said other end, a mold holder having a frusto-conic wall receiving the mold halves, an outwardly extending wedge-shaped rib on each mold engaging the frusto-conic wall to drive the mold halves together with the flat faces thereof in flatwise engagement, an axially extending rib on each mold half on the outer edge of the end face thereof, and a measuring cup having an outwardly extending flange at a mouth thereof, there being slots on inner faces of the axially extending ribs receiving portions of the flange of the measuring cup, the measuring cup being sealed to the mold halves when the measuring cup and the holder are urged together and the contents of the assembly are shaken.

2. A shaker molding assembly as in claim 1 wherein the axially extending ribs form an annulus surrounding the flange of the measuring cup.

3. A shaker molding assembly as in claim 1 wherein outer edges of the flat faces of the mold halves are wedge-shaped and engage the frusto-conic wall of the mold holder.

4. A shaker molding assembly as in claim 1 wherein outer edges of the flat faces of the mold halves are provided with cooperating members for aligning the mold halves during assembly.

5. A shaker molding assembly as in claim 1 wherein the flat face, the end face plate, and the wedge-shaped rib of each mold half are mutually perpendicular.

* * * * *

UNITED STATES PATENT OFFICE
CERTIFICATE OF CORRECTION

Patent No. 3,989,220　　　　　　　Dated November 2, 1976

Inventor(s)　Allen A. Greenberg

It is certified that error appears in the above-identified patent and that said Letters Patent are hereby corrected as shown below:

Column 4, line 35, before "engaging" insert --half--.

Signed and Sealed this

Eleventh Day of January 1977

[SEAL]

Attest:

RUTH C. MASON
*Attesting Officer*

C. MARSHALL DANN
*Commissioner of Patents and Trademarks*